US011005128B2

(12) United States Patent
Mccalla et al.

(10) Patent No.: US 11,005,128 B2
(45) Date of Patent: May 11, 2021

(54) LITHIUM ION BATTERIES AND METHODS OF STERILIZATION

(71) Applicant: Medtronic, Inc., Minneapolis, MN (US)

(72) Inventors: Laura E. Mccalla, Brossard (CA); Gaurav Jain, Edina, MN (US)

(73) Assignee: Medtronic, Inc., Minneapolis, MN (US)

( * ) Notice: Subject to any disclaimer, the term of this patent is extended or adjusted under 35 U.S.C. 154(b) by 206 days.

(21) Appl. No.: 15/838,621

(22) Filed: Dec. 12, 2017

(65) Prior Publication Data
US 2018/0175459 A1   Jun. 21, 2018

Related U.S. Application Data

(60) Provisional application No. 62/435,237, filed on Dec. 16, 2016.

(51) Int. Cl.
*H01M 50/409* (2021.01)
*H01M 4/485* (2010.01)
(Continued)

(52) U.S. Cl.
CPC ........... *H01M 10/44* (2013.01); *H01M 4/485* (2013.01); *H01M 4/587* (2013.01); *H01M 4/625* (2013.01);
(Continued)

(58) Field of Classification Search
CPC ........... H01M 10/052; H01M 10/0525; H01M 10/0567; H01M 10/0568; H01M 10/0569;
(Continued)

(56) References Cited

U.S. PATENT DOCUMENTS 4,678,868 A   7/1987 Kraska et al.
5,104,755 A   4/1992 Taylor et al.
(Continued)

FOREIGN PATENT DOCUMENTS

EP   1978587   10/2008
EP   2849266   3/2015
EP   2983233   2/2016

OTHER PUBLICATIONS

Xilin Chen, Wu Xu, Mark H. Engelhard, Jianming Zheng, Yaohui Zhang, Fei Ding, Jiangfeng Qian and Ji-Guang Zhang, "Mixed salts of LiTFSI and LiBOB for stable LiFePO4-based batteries at elevated temperatures", J. Mater. Chem. A, 2014, 2, 2346-2352. (Year: 2014).*

(Continued)

*Primary Examiner* — Maya Gonzalez Ramos
(74) *Attorney, Agent, or Firm* — Mueting Raasch Group

(57) ABSTRACT

A lithium ion battery is provided that includes: a positive electrode; a negative electrode; a separator comprising a material having a melt temperature of greater than 150° C.; and an electrolyte including an organic solvent and a lithium salt. A method for sterilizing a lithium ion battery is also provided that includes: providing a lithium ion battery (particularly one as described herein); either charging or discharging the battery to a state of charge (SOC) of 20% to 100%; and steam sterilizing the battery to form a sterilized lithium ion battery.

17 Claims, 5 Drawing Sheets

(51) Int. Cl.
*H01M 4/587* (2010.01)
*H01M 4/62* (2006.01)
*H01M 10/0525* (2010.01)
*H01M 10/0567* (2010.01)
*H01M 10/0568* (2010.01)
*H01M 10/0569* (2010.01)
*H01M 10/44* (2006.01)
*H01M 4/02* (2006.01)

(52) U.S. Cl.
CPC ... *H01M 10/0525* (2013.01); *H01M 10/0567* (2013.01); *H01M 10/0568* (2013.01); *H01M 10/0569* (2013.01); *H01M 50/409* (2021.01); *H01M 2004/027* (2013.01); *H01M 2004/028* (2013.01); *H01M 2300/0037* (2013.01)

(58) Field of Classification Search
CPC ...... H01M 4/485; H01M 4/587; H01M 4/625; H01M 2004/027; H01M 2004/028; H01M 2300/0037; H01M 2300/0082
See application file for complete search history.

(56) References Cited

U.S. PATENT DOCUMENTS

| | | |
|---|---|---|
| 5,114,811 A | 5/1992 | Ebel et al. |
| 6,150,057 A | 11/2000 | Takeuchi |
| 6,733,928 B2 | 5/2004 | Takeuchi |
| 6,756,766 B2 | 6/2004 | Miller |
| 7,807,300 B2 | 10/2010 | Merritt et al. |
| 8,105,714 B2 | 1/2012 | Schmidt et al. |
| 8,936,878 B2 | 1/2015 | Morin |
| 9,017,353 B2 | 4/2015 | Bence et al. |
| 9,065,145 B2 | 6/2015 | Schmidt et al. |
| 9,130,229 B2 | 9/2015 | Chen et al. |
| 9,172,085 B2 | 10/2015 | Divigalpitiya et al. |
| 2004/0012370 A1 | 1/2004 | Miller |
| 2004/0072072 A1 | 4/2004 | Suzuki et al. |
| 2006/0019164 A1 | 1/2006 | Bonhomme et al. |
| 2007/0031732 A1 | 2/2007 | Chiang et al. |
| 2007/0178371 A1 | 8/2007 | Merritt et al. |
| 2007/0190418 A1 | 8/2007 | Chiang et al. |
| 2009/0181291 A1 | 7/2009 | Lewis, II et al. |
| 2011/0053004 A1* | 3/2011 | Saruwatari ............ H01M 4/131 429/342 |
| 2014/0045082 A1* | 2/2014 | Taniuchi ............... H01M 12/08 429/405 |
| 2015/0263385 A1* | 9/2015 | Yoon .................... H01M 4/583 429/333 |
| 2015/0349307 A1* | 12/2015 | Dadheech ............ H01M 2/145 427/446 |
| 2016/0141718 A1 | 5/2016 | Ye et al. |
| 2016/0233546 A1* | 8/2016 | Feng ................. H01M 10/0567 |
| 2018/0159173 A1* | 6/2018 | Chika .................... C07C 43/04 |

OTHER PUBLICATIONS

French Ministry of Health, "Relative to the precautions to be observed during care to reduce the risk of transmission of non-conventional transmissible agents" [retrieved on Jan. 17, 2017]. Retrieved from the Internet <URL: http://social-sante.gouv.fr/fichiers/bo/2001/01-11/a0110756.html> 19 pages.

Rutala et al., "Guideline for Disinfection and Sterilization in Healthcare Facilities" From Centers for Disease Control and Prevention. [retrieved on Jan. 17, 2017]. Retrieved from the Internet <URL: https://www.cdc.gov/hicpac/Disinfection_Sterilization/13_0Sterilization.html> 158 pages.

Xu, Kang, "Nonaqueous Liquid Electrolytes for Lithium-Based Rechargeable Batteries" 2004 Chemical Reviews, vol. 104, pp. 4303-4417.

(PCT/US2017/065808) PCT Notification of Transmittal of the International Search Report and the Written Opinion of the International Searching Authority, dated Feb. 26, 2018, 12 pages.

\* cited by examiner

LITHIUM ION BATTERIES AND METHODS OF STERILIZATION

This application claims the benefit of provisional patent application No. 62/435,237 entitled "Lithium Ion Batteries and Methods of Sterilization" filed Dec. 16, 2016.

BACKGROUND

For many surgical powered tools the ability to be both cordless and rechargeable has been a major selling feature. For such high powered, high energy applications, the use of lithium ion battery technology is particularly well suited. In order to be used in an operating room, however, the surgical instrument must be sterilized.

There are three approaches currently used to address this problem:

(1) Aseptic transfer of the battery into a sterile device. This requires two people to set up the device, one to handle the unsterile battery and the other to remain in the sterile field and only handle the sterile (e.g., autoclaved) device once the battery was inserted by the other person.

(2) STERRAD, which includes hydrogen peroxide vapor and low-temperature gas plasma low temperature sterilization of the battery pack (temperature less than 55° C.). This requires specialized additional equipment to be purchased by the hospitals.

(3) Aseptic transfer into sterile clamshell. This requires additional packaging and two people for aseptic transfer as described in approach (1). In order to improve case-of-use and minimization of additional hospital equipment, it would be beneficial to be able to autoclave the entire instrument. In order to achieve this goal, the lithium ion battery must withstand a standard steam autoclave cycle (134° C. for 18 minutes) and maintain usability at application temperature for 100 to 300 cycles.

Many components of current commercial lithium ion batteries cannot withstand the extreme temperatures of approach (3). For example, polyethylene, a component of a commonly used tri-layer shutdown separator, melts at or below 130° C. Linear carbonate solvents used in commercial lithium ion batteries can have a low boiling point (less than 140° C.). Also, $LiPF_6$, a commonly used electrolyte salt decomposes near 80° C. Furthermore, corrosion of the metal current collectors is greatly accelerated at high temperatures, which can lead to delamination of the active material. Thus, lithium ion batteries are needed that withstand the conditions of steam autoclave conditions.

SUMMARY

The present disclosure is directed to lithium ion batteries, as well as methods of sterilizing such batteries.

Such lithium ion batteries have a lithium ion cell chemistry with unique combinations of current collectors, electrolytes, separators, and cell encasements, which can withstand the conditions experienced in an autoclave, and suffer very little to no detectable loss in application temperature performance compared to an otherwise identical cell not subjected to the autoclave conditions.

In one embodiment, a lithium ion battery is provided that includes: a positive electrode; a negative electrode; a separator that includes a material having a melt temperature of greater than 150° C.; and an electrolyte including an organic solvent and a lithium salt; wherein the organic solvent includes a solvent having a boiling point below 140° C. (e.g., a linear carbonate); and wherein the lithium salt includes lithium bis(trifluoromethanesulfonimide) (LiTFSI). The positive electrode includes: a positive current collector including aluminum; positive electrode material including a lithium-containing metal oxide or a lithium-containing metal phosphate; a binder; and conductive carbon. The negative electrode includes: a negative current collector including copper, aluminum, titanium, or carbon; negative electrode material including a lithium titanium oxide, a carbon-containing material capable of intercalating lithium, a metal-alloy containing material capable of intercalating lithium, or a combination thereof; a binder; and conductive carbon. For such battery, after exposure to conditions that include a temperature of at least 100° C. for a time of at least 4 minutes, the battery retains a capacity of at least 80% of the capacity at application temperature of a battery having the same construction that has not been subjected to such conditions.

In another embodiment, a lithium ion battery is provided that includes: a positive electrode; a negative electrode; a separator having a melt temperature of greater than 150° C.; an electrolyte; and a hermetically sealed encasement. The electrolyte includes: a lithium salt including a combination of LiTFSI, LiBOB, and $LiPF_6$, wherein the $LiPF_6$ is present in an amount of no greater than 25 mol-% of the total moles of electrolyte salt (or at a concentration of up to 0.3M); and an organic solvent including a mixture of ethylene carbonate (EC) and ethylmethyl carbonate (EMC). The positive electrode includes: a positive current collector including carbon-coated aluminum; positive electrode material including $LiCoO_2$; a binder; and conductive carbon. The negative electrode includes: a negative current collector including copper; negative electrode material including artificial graphite; a binder; and conductive carbon. For such battery, after exposure to conditions that include a temperature of at least 100° C. for a time of at least 4 minutes, the battery retains a capacity of at least 80% of the capacity at application temperature of a battery having the same construction that has not been subjected to such conditions.

In yet another embodiment, a method for sterilizing a lithium ion battery, the method includes: providing a lithium ion battery (e.g., particularly one as described herein), either charging or discharging the battery to a state of charge (SOC) of 20% to 100%, or of 20% to 80%; and steam sterilizing the battery to form a sterilized lithium ion battery.

The term "application temperature" means a temperature within a range of 10° C. to 45° C.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The terms "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used herein, "a," "an," "the," "at least one," and "one or more" are used interchangeably. Thus, for example, a device that comprises "a" capacitor can be interpreted to mean that the device includes "one or more" capacitors.

As used herein, the term "or" is generally employed in its sense including "and/or" unless the content clearly dictates otherwise. The term "and/or" means one or all of the listed elements or a combination of any two or more of the listed elements (e.g., delivering therapy and/or monitoring physiological signals means delivering therapy, monitoring physiological conditions, or doing both monitoring and delivering).

Also herein, all numbers are assumed to be modified by the term "about" and preferably by the term "exactly." Notwithstanding that the numerical ranges and parameters setting forth the broad scope of the disclosure are approximations, the numerical values set forth in the specific examples are reported as precisely as possible. All numerical value, however, inherently contain certain errors necessarily resulting from the standard deviation found in their respective testing measurements.

Also herein, the recitations of numerical ranges by endpoints include all numbers subsumed within that range (e.g., 1 to 5 includes 1, 1.5, 2, 2.75, 3, 3.80, 4, 5, etc.).

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF FIGURES

The figures presented herein are idealized, not to scale, and are intended to be merely illustrative and non-limiting.

DETAILED DESCRIPTION OF ILLUSTRATIVE EMBODIMENTS

Figure 1:
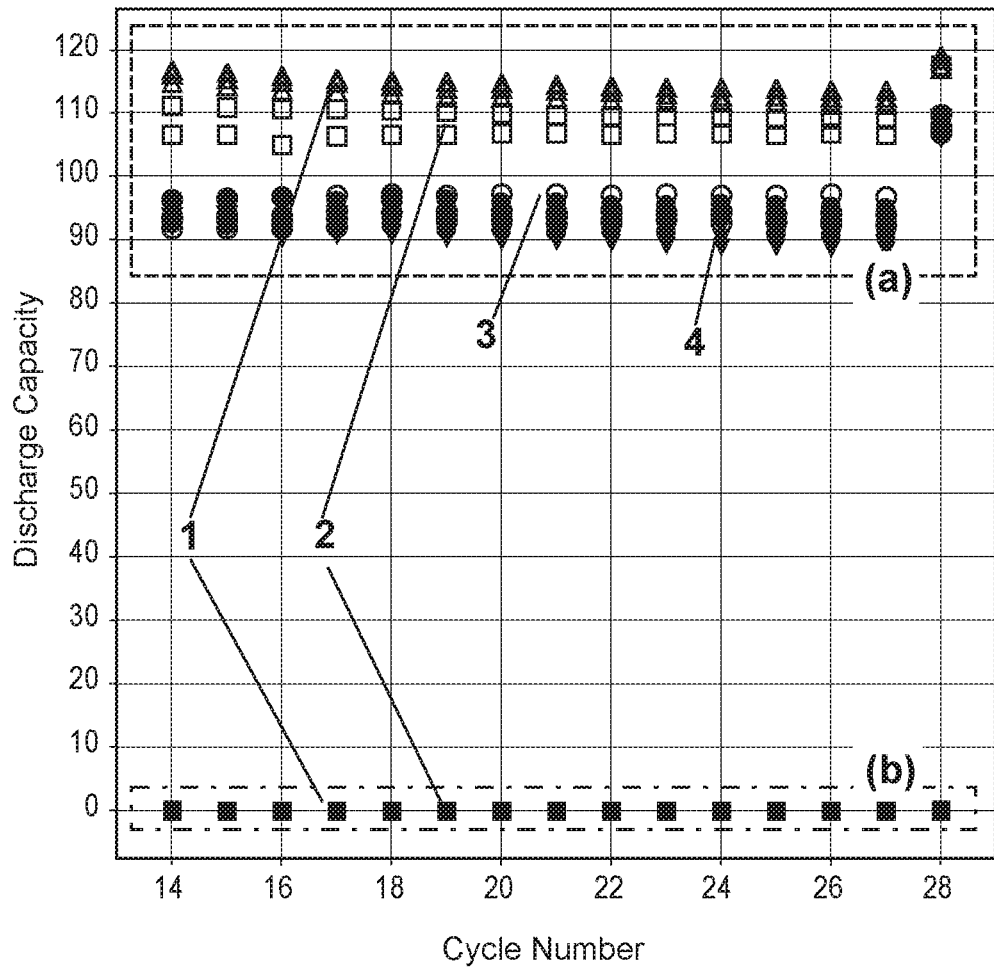
FIG. 1: Discharge capacity as a function of cycle number for the final electrochemical performance test for Examples 1 through 4.

The present disclosure is directed to lithium ion batteries, as well as methods of sterilizing such batteries.

A typical battery includes one or more cells that includes a negative electrode (anode), a positive electrode (cathode), a separator between the negative and positive electrodes; and an electrolyte (typically, a liquid electrolyte, although a gel electrolyte may also be possible) contacting the negative electrode, positive electrode, and the separator.

Such batteries can be used in a wide variety of surgical powered tools, including, for example, ultrasonic dissectors, vessel sealing devices, staplers, orthopedic saws/drills, or the modular surgical device disclosed in U.S. Pat. No. 9,017,353 (Smith et al.). More generally, the types of surgical devices include hand-held, powered medical diagnostic and surgical tools and wearable medical devices. Examples include RF powered surgical sealing devices, nerve integrity monitoring devices, ablation devices, powered atherectomy devices, external, wearable stimulation devices, and external, wearable diagnostic devices.

Typical lithium ion batteries operate within a narrow temperature range, from −20° C. to +60° C. with a high delivered power at room temperature. This covers the majority of uses of lithium ion batteries. There are some specialty batteries that are designed to operate at extremely high temperatures, including up to 180° C. for deep drilling applications (see, e.g., U.S. Pat. Pub. No. US 2006/0019164 (Bonhommet et al.)). This particular battery exclusively uses high boiling point (bp) solvents (bp greater than or equal to 140° C.) such as ethylene carbonate (EC) and propylene carbonate (PC). At application temperature, however, these cyclic carbonate solvents have very high viscosities (and therefore low ionic conductivities), resulting in poor application temperature power performance (see, e.g., Kang Xu, Chemical Reviews, 104, 4303-4417 (2004)).

The lithium ion batteries of the present disclosure are simultaneously capable of surviving exposure to an elevated temperature as high as 140° C. for up to 3 hours (temperatures and times experienced, for example, during steam sterilization), while maintaining a high delivered power when subsequently used at application temperature. In this context, "surviving" is defined as delivering at least 80% of the battery's capacity at application temperature, compared to a battery of the same construction that did not experience the exposure to the elevated temperature. That is, in certain embodiments, after steam sterilization, the battery retains a capacity of at least 80% of the capacity of a battery having the same construction that has not been sterilized.

The batteries of the present disclosure are capable of achieving this high capacity retention and power capability following high temperature exposure through the use of at least one solvent that has a low boiling point (bp less than or equal to exposure temperature (approximately 140° C.)) and low viscosity (high ionic conductivity), and the use of a lithium salt or combination of salts to stabilize the solvent (up to the exposure temperature), while maintaining a high electrolyte conductivity for application temperature.

Such batteries can be subjected to steam sterilization, particularly while in surgical tools. Desirably, in certain embodiments, the lithium ion batteries of the present disclosure can withstand a standard autoclave cycle (e.g., 134° C. for 18 minutes). In certain embodiments, the battery retains a capacity of at least 80% of the capacity of a battery having the same construction that has not been sterilized. In certain embodiments, such capacity is maintained at application temperature after several cycles of sterilization, preferably for up to hundreds (e.g., 100 to 300) of sterilization cycles.

In certain embodiments of batteries of the present disclosure, after exposure to conditions that include a temperature of at least 100° C. for a time of at least 4 minutes, or at least 12 minutes, or at least 18 minutes, or at least 90 minutes, or at least 120 minutes, or at least 180 minutes, or at least 360 minutes, the battery retains a capacity of at least 80% of the capacity at application temperature of a battery having the same construction that has not been subjected to such conditions.

In certain embodiments of batteries of the present disclosure, after exposure to conditions that include a temperature of at least 121° C. for a time of at least 4 minutes, or at least 12 minutes, or at least 18 minutes, or at least 90 minutes, or at least 120 minutes, or at least 180 minutes, or at least 360 minutes, the battery retains a capacity of at least 80% of the capacity at application temperature of a battery having the same construction that has not been subjected to such conditions.

In certain embodiments of batteries of the present disclosure, after exposure to conditions that include a temperature of at least 132° C. for a time of at least 4 minutes, or at least 12 minutes, or at least 18 minutes, or at least 90 minutes, or at least 120 minutes, or at least 180 minutes, or at least 360 minutes, the battery retains a capacity of at least 80% at application temperature of the capacity of a battery having the same construction that has not been subjected to such conditions.

In certain embodiments of batteries of the present disclosure, after exposure to conditions that include a temperature of at least 135° C. for a time of at least 4 minutes, or at least 12 minutes, or at least 18 minutes, or at least 90 minutes, or at least 120 minutes, or at least 180 minutes, or at least 360 minutes, the battery retains a capacity of at least 80% at application temperature of the capacity of a battery having the same construction that has not been subjected to such conditions.

In certain embodiments of batteries of the present disclosure, after exposure to conditions that include a temperature of at least 140° C. for a time of at least 4 minutes, or at least 12 minutes, or at least 18 minutes, or at least 90 minutes, or at least 120 minutes, or at least 180 minutes, or at least 360 minutes, the battery retains a capacity of at least 80% at application temperature of the capacity of a battery having the same construction that has not been subjected to such conditions.

Positive Electrode

In lithium ion batteries of the present disclosure, a positive electrode includes a positive current collector, positive electrode material, a binder, and conductive carbon.

In certain embodiments, the positive current collector includes aluminum. In certain embodiments, the positive current collector includes surface-treated aluminum. In certain embodiments, the surface-treated aluminum includes carbon-coated aluminum. The carbon coating may be a carbon nanotube coating or other carbon nano-scale coating. An example of such a carbon nano-scale coating is disclosed in U.S. Pat. No. 9,172,085 (Ranjith Divigalpitiya et al.). Because of the large surface area of the nano-scale material much less of the material is needed, and it is typically more conductive, than a conventional carbon-coating.

In certain embodiments, the surface-treated aluminum includes a coating designed to raise the cell impedance at temperatures above 135° C. An example of such a coating is a positive temperature coefficient (PTC) treatment. In certain embodiments, the PTC treatment may be extended onto the tab material that connects to the positive electrode current collector.

In certain embodiments, the positive electrode material includes a lithium-containing metal oxide or a lithium-containing metal phosphate. In certain embodiments, the positive electrode material includes a lithium-containing metal oxide, such as, for example, $LiCoO_2$ or $LiNiCoMn/AlO_2$. In certain embodiments, the positive electrode material includes a lithium-containing metal phosphate, such as, for example, $LiFePO_4$.

In certain embodiments, the positive electrode material includes a lithium-containing metal oxide that is surface treated. In certain embodiments, the surface-treated positive electrode material includes a surface treatment selected from a metal oxide ($Al_2O_3$, etc.), a metal phosphate ($LaPO_4$, etc.), a metal halide, carbon, or a mixture thereof. In certain embodiments, this surface-treatment includes a positive temperature coefficient material.

In certain embodiments, the positive electrode binder includes carboxy methyl cellulose (CMC), styrene-butadiene rubber (SBR), polyvinylidene fluoride (PVDF), polytetrafluoroethylene (PTFE), or a mixture of two or more thereof. In certain embodiments, the positive electrode binder includes PVDF.

In certain embodiments, the positive electrode binder is used in an amount of at least 0.1 wt-%, based on the total weight of the dry cathode mix (without solvent). In certain embodiments, the positive electrode binder is used in an amount of up to 10 wt-%, based on the total weight of the dry cathode mix (without solvent).

In certain embodiments, the conductive carbon is used in an amount of at least 0.1 wt-%, based on the total weight of the dry cathode mix (without solvent). In certain embodiments, the conductive carbon is used in an amount of up to 10 wt-%, based on the total weight of the dry cathode mix (without solvent). Types of conductive carbon include, for example, graphite, carbon black, carbon nanotubes, and graphene.

In certain embodiments, a positive temperature coefficient material is used in an amount of at least 0.1 wt-% based on the total weight of the dry cathode mix (without solvent).

Negative Electrode

In lithium ion batteries of the present disclosure, a negative electrode includes a negative current collector, negative electrode material, a binder, and conductive carbon.

In certain embodiments, the negative current collector includes copper, aluminum, titanium, or carbon. In certain embodiments, the negative current collector is surface treated. In certain embodiments, the surface-treated negative current collector includes surface treatment selected from a carbon coating, a nitrogen coating, or an oxide coating, on the copper, aluminum, titanium, or carbon.

In certain embodiments, this surface-treatment includes a positive temperature coefficient material. In certain embodiments, the PTC treatment may be extended onto the tab material that connects to the negative electrode current collector.

In certain embodiments, the negative current collector includes copper, particularly when the negative electrode material includes graphite. In certain embodiments, the negative current collector includes aluminum, particularly when the negative electrode material comprises a lithium titanium oxide.

In certain embodiments, the negative electrode material includes a lithium titanium oxide, a carbon-containing material capable of intercalating lithium, a metal-alloy containing material capable of intercalating lithium, or a combination thereof.

In certain embodiments, the negative electrode material includes a lithium titanium oxide. In certain embodiments, the lithium titanium oxide is selected from the group of: $Li_4M_xTi_{5-x}O_{12}$ (wherein M is metal selected from aluminum, magnesium, nickel, cobalt, iron, manganese, vanadium, copper, chromium, molybdenum, niobium, or combinations thereof and x=0-1); $Li_xTi_yO_4$ (wherein x=0-4, and y=0-2); $Li_2TiO_3$; $Li_4Ti_5O_{12}$; $Li_4Ti_{4.75}V_{0.25}O_{12}$; $Li_4Ti_{4.75}Fe_{0.25}O_{11.88}$; $Li_4Ti_{4.5}Mn_{0.5}O_{12}$; and $LiM'M''XO_4$ (wherein: M' is a metal selected from nickel, cobalt, iron, manganese, vanadium, copper, chromium, molybdenum, niobium, or combinations thereof; M'' is a three valent non-transition metal; and X is zirconium, titanium, or a combination of these two). In certain embodiments, the lithium titanate spinel material is used in any state of lithiation (e.g., $Li_{4+x}Ti_5O_{12}$, where $0 \leq x \leq 3$). In certain embodiments, the lithium titanium oxide is of the formula $Li_4Ti_5O_{12}$ (sometimes referred to as $Li_{1+x}[Li_{1/3}Ti_{5/3}]O_4$, with $0 \leq x < 1$).

In certain embodiments, the negative electrode material includes a carbon-containing material capable of intercalating lithium. In certain embodiments, the negative electrode material includes graphite. In certain embodiments, the graphite includes artificial graphite (e.g., mesocarbon microbead (MCMB)).

In certain embodiments, the negative electrode material including a metal-alloy containing material capable of intercalating lithium. In certain embodiments, the metal-alloy containing material includes silicon-containing material or tin-containing material that is capable of intercalating lithium. The alloy material may be mixed with carbonaceous material.

In certain embodiments, the negative electrode binder includes carboxy methyl cellulose (CMC), styrene-butadiene rubber (SBR), polyvinylidene fluoride (PVDF), polytetrafluoroethylene (PTFE), or a mixture of two or more thereof. In certain embodiments, the negative electrode binder includes PVDF.

In certain embodiments, the negative electrode binder is used in an amount of at least 0.1 wt-%, or at least 1 wt-%, based on the total weight of the dry anode mix (without solvent). In certain embodiments, the negative electrode binder is used in an amount of up to 10 wt-%, based on the total weight of the dry anode mix (without solvent).

In certain embodiments, the conductive carbon is used in an amount of at least 0.1 wt-%, based on the total weight of the dry anode mix (without solvent). In certain embodiments, the conductive carbon is used in an amount of up to 10 wt-%, based on the total weight of the dry anode mix (without solvent). Types of conductive carbon include, for example, graphite, carbon black, carbon nanotubes, and graphene.

In certain embodiments, a positive temperature coefficient material is used in an amount of at least 0.1 wt-% based on the total weight of the dry anode mix (without solvent).

Separator

Lithium ion batteries of the present disclosure include a separator between the negative and positive electrodes. In certain embodiments, the separator includes a material that has a melt temperature of greater than 150° C. In certain embodiments, the separator includes one or more layers of material having a melt temperature of greater than 150° C. Such layers may or may not be bonded together.

In certain embodiments, the separator material having a melt temperature of greater than 150° C. includes a polyimide, polyolefin (such as polypropylene), polyethylene terephthalate, ceramic-coated polyolefin, cellulose, or a mixture of two or more thereof. Such materials may be in the form of microfibers or nanofibers. In certain embodiments, the separator includes a combination of microfibers and nanofibers. In certain embodiments, the separator includes polyethylene terephthalate microfibers and cellulose nanofibers.

Such separator materials are disclosed in U.S. Pat. No. 8,936,878 (Morin) and available from Dreamweaver International (Greer, S.C.) under the tradename SILVER.

In certain embodiments, multiple separator layers may be used, each of which has a melting point greater than 150° C. However, one of these layers may have a melting point lower than the other layer and may serve the purpose of a shutdown separator. For example, an inner layer of a separator may have a melting point of approximately 130° C. and a layer that may have a melting point of approximately 160° C. In this embodiment, the inner layer would melt at a temperature of 130° C., preventing ion flow in the battery but maintaining separation between the anode and cathode to prevent shorting. In other embodiments, the inner layer of the separator may have a melting point of 130° C. and the outer layer may have a melting point of >200° C. An example of a useful material having a melting point of approximately 130° C. is a polyethylene. Examples of useful materials that have a melting point of >200° C. include polyimide, polyethylene terephthalate, cellulose, aramid fibers, ceramics, and combinations thereof. In certain embodiments, the multiple separator layers with different melting points may be laminated together to form a single multi-layer composite separator. In certain embodiments, a layer of positive temperature coefficient material may be used.

In certain embodiments, the separator is no more than 250 micrometers (i.e., microns) thick. In certain embodiments, the separator is at least 5 microns, or at least 10 microns thick.

Electrolyte

Lithium ion batteries of the present disclosure include an electrolyte contacting the negative electrode, positive electrode, and the separator. The electrolyte is typically a liquid, but it may also be a gel. The electrolyte includes an organic solvent and a salt. Additionally, the electrolyte may include a polymer.

In certain embodiments, the salt includes a lithium salt, particularly lithium bis(trifluoromethanesulfonimide) (LiTFSI). In certain embodiments, the electrolyte salt consists of one or more lithium salts. That is, in certain embodiments, the only salts present in the electrolyte are lithium salts. In certain embodiments, whether other non-lithium salts are present or not, the electrolyte includes a combination of lithium salts.

In certain embodiments, the electrolyte includes an additional lithium salt selected from lithium bis(oxalato)borate (LiBOB), lithium bis(pentafluoroethylsulfonyl)imide (LiBETI), lithium bis(fluorosulfonyl)imide (LiFSI), lithium difluoro(oxalato)borate (LiDFOB), lithium tetrafluoroborate ($LiBF_4$), lithium trifluoromethanesulfonate (LiTriflate), lithium hexafluoroarsenate ($LiAsF_6$), lithium hexafluorophosphate ($LiPF_6$), or a mixture of two or more thereof.

In certain embodiments, the electrolyte includes LiTFSI and $LiPF_6$. In certain embodiments, the electrolyte includes LiTFSI and LiBOB. In certain embodiments, the electrolyte includes LiTFSI, LiBOB, and $LiPF_6$.

The use of salt blends provides surprising benefits that cannot be achieved by individual salts. These results are not predictable.

Generally, the use of LiTFSI as the only salt leads to rapid capacity loss following high temperature exposure; however, a blend of LiTFSI and LiBOB leads to much improved performance. This may be due to reduced positive electrode current collector corrosion achieved by the salt blend.

Use of $LiPF_6$ alone leads to rapid mechanical and electrochemical degradation of cells when exposed to high temperature. Generally, the use of a blend of $LiPF_6$ and LiTFSI leads to rapid loss in capacity, upon high temperature exposure. Use of a blend of $LiPF_6$, LiTFSI, and LiBOB, where the $LiPF_6$ amount is less than 25% of the total moles of salt shows good high temperature stability. Further, this blend also shows improved application temperature power capability. The following embodiments encompass these findings.

In certain embodiments, the electrolyte includes LiTFSI in an amount of at least 50 mol-%, of the total moles of electrolyte salt (or at a concentration of at least 0.5M). In certain embodiments, the electrolyte includes LiTFSI in an amount of up to 100 mol-% of the total moles of electrolyte salt (or at a concentration of up to 5.5M).

In certain embodiments, if $LiPF_6$ is present in the electrolyte, it is present in an amount of no greater than 25 mol-% of the total moles of electrolyte salt (or at a concentration of up to 0.3M). In certain embodiments, the electrolyte includes $LiPF_6$ at a concentration of at least 0.01M (or in an amount of at least 1 mole-% of the total moles of electrolyte salt).

In certain embodiments, the electrolyte includes LiBOB in an amount of at least 2 mol-% of the total moles of electrolyte salt (or at a concentration of at least 0.01M). In certain embodiments, the electrolyte includes LiBOB up to the solubility limit of LiBOB.

In certain embodiments, the electrolyte comprises 81.8 mol-% LiTFSI and 18.2 mol-% LiBOB of the total moles of electrolyte salt (or 0.9M LiTFSI and 0.2M LiBOB).

In certain embodiments, the electrolyte includes 81.8 mol-% LiTFSI, 13.6 mol-% LiBOB, and 4.5 mol-% $LiPF_6$ of the total moles of electrolyte salt (or 0.9M LiTFSI, 0.15M LiBOB, and 0.05M $LiPF_6$).

In certain embodiments, the organic solvent of the electrolyte includes a solvent having a boiling point below 140° C. Examples of such solvents include linear carbonates, as well as certain ethers (such as 1,2-diethoxyethane (DME)), linear carboxylic esters (such as methyl formate, methyl acetate, ethyl acetate, methyl propionate), and nitriles (such as acetonitrile).

In certain embodiments, the organic solvent includes a linear carbonate, such as ethylmethyl carbonate (EMC), dimethyl carbonate (DMC), diethyl carbonate (DEC), or a mixture of two or more thereof.

In certain embodiments, the organic solvent includes a mixture of ethylene carbonate (EC) and ethylmethyl carbonate (EMC). In certain embodiments, the organic solvent includes a mixture of ethylene carbonate (EC) and ethylmethyl carbonate (EMC) in a range of 10:90 to 50:50. In certain embodiments, the organic solvent includes a mixture of ethylene carbonate (EC) and ethylmethyl carbonate (EMC) in a ratio of 30:70.

Significantly, because of the use of at least one linear carbonate solvent, which has a low boiling point (bp less than or equal to exposure temperature (approximately 140° C.)) and low viscosity (high ionic conductivity), and the use of a lithium salt or combination of salts to stabilize such low boiling solvent (up to the exposure temperature), while maintaining a high electrolyte conductivity for application temperature, the lithium ion batteries of the present disclosure are simultaneously capable of surviving exposure to an elevated temperature as high as 140° C. for up to 3 hours (temperatures and times experienced, for example, during steam sterilization), while maintaining a high delivered power when subsequently used at application temperature. In certain embodiments, as a result of the combination of the low boiling point solvent(s) and the selected lithium salt(s), the lithium ion batteries of the present disclosure withstand a standard steam autoclave cycle (134° C. for 18 minutes) and maintain usability at application temperature for 100 to 300 cycles.

In certain embodiments, the organic solvent further includes a cyclic carbonate, such as ethylene carbonate (EC), propylene carbonate (PC), butylene carbonate (BC), fluoroethylene carbonate (FEC), or a mixture of two or more thereof. If used, these high boiling point (bp) solvents (bp greater than or equal to 140° C.) are used in a small amount because at application temperature, they have very high viscosities (and therefore low ionic conductivities), resulting in poor application temperature power performance (see, e.g., Kang Xu, Chemical Reviews, 104, 4303-4417 (2004)). Thus, if used, they are used in an amount of up to 50 wt-%, or up to 40 wt-%, or up to 30 wt-%.

The amount of organic solvent used in the electrolyte is dependent on battery size, and other parameters that are application driven.

In certain embodiments, the electrolyte includes a polymer, thereby forming a gel. In certain embodiments, such polymers include PEO (poly(ethylene oxide)), PEGDA (poly(ethylene glycol diacrylate)), PVDF (poly(vinylidene fluoride)), PVDF-HFP (poly(vinylidene fluoride-co-hexafluorophosphate)), PMMA (poly(methyl methacrylate)), methyl cellulose, hypromellose, poly(butyl acrylate) and similar acrylates.

In certain embodiments, the electrolyte includes an electrolyte additive. Such electrolyte additives are typically used to enable higher voltage operation (e.g., greater than 4.2V), but are used herein at lower voltages (e.g., 4.1V) and at high temperatures (e.g., 140° C.).

In certain embodiments, the electrolyte additive is selected from an unsaturated compound (such as vinylene carbonate (VC) and vinyl ethylene carbonate (VEC)), a sulfur-containing compound (such as 1,3-propane sultone (PS), prop-1-ene 1,3-sultone (PES), 1,3,2-dioxathiolane-2, 2-dioxide (DTD), trimethylene sulfate (TMS), and methylene methyl disulfonate (MMDS)), a boron-containing compound (such as trimethylboroxine and trimethoxyboroxine (TMOBX)), a phosphorus-containing compound (such as tris(1,1,1,3,3,3-hexafluoro-2-isopropyl)phosphate (HFiP), tris(trimethylsilyl) phosphate (TTSP), tris(trimethylsilyl) phosphite (TTSPi), and triallyl phosphate (TAP)), an aromatic compound (such as biphenyl (BP)), a heterocyclic compound (such as thiophene (TP)), a Lewis acid-base adduct (such as pyridine-boron trifluoride (PBF)), and a mixture of two or more thereof.

In certain embodiments, the boron-containing additives include boroxine-containing compounds (e.g., trimethylboroxine and trimethoxyboroxine (TMOBX) or its derivatives), compounds including boroxine rings with polyalkylene oxide chains (e.g., tris(poly(oxyethylene)) boroxine), and compounds having boroxine rings with substituted or unsubstituted phenyl rings (e.g., triphenyl boroxine, tris(4-fluorophenyl) boroxine, and tris(pentafluorophenyl) boroxine). Other boron-containing compounds include derivatives of boronate esters and borinate esters such as difluorophenoxy methyl borane, dihexafluoroisopropoxy methyl borane, dihexafluoroisopropoxy phenyl borane.

In certain embodiments, the electrolyte additive is present in the electrolyte in an amount of at least 5 wt-%. In certain embodiments, the electrolyte additive is present in the electrolyte in an amount of up to 10 wt-%. The amount of electrolyte additive, however, depends on battery size, and other parameters that are application driven.

Battery Encasement and Methods of Making Batteries

A typical battery includes one or more cells that include a negative electrode, a positive electrode, a separator between the negative and positive electrodes, and an electrolyte encased in an encasement typically made of a corrosion-resistant material. The corrosion-resistant material may be, for example, aluminum, stainless steel, aluminum laminate, ceramic, or combinations thereof.

In certain embodiments, the encasement is hermetically sealed. Such hermetic seal prevents transfer of gas and/or liquid in or out of the encasement. Suitable hermetically sealed encasements include glass or ceramic insulator around a feed through, as described, for example, in U.S. Pat. No. 5,104,755 (Taylor et al.) and U.S. Pat. No. 4,678,868 (Kraska et al.).

Lithium ion batteries of the present disclosure can be constructed using well known techniques, such as those described in the Examples Section.

Methods of Sterilizing Batteries

The present disclosure includes methods for sterilizing lithium ion batteries. In certain embodiments, such methods include the lithium ion batteries disclosed herein, although other lithium ion batteries may be sterilized using the present method.

In certain embodiments, a method for sterilizing a lithium ion battery includes: providing a lithium ion battery; either charging or discharging the battery to a state of charge (SOC) of 20% to 100%; and steam sterilizing the battery to form a sterilized lithium ion battery.

In certain embodiments, the method includes either charging or discharging the battery to a state of charge (SOC) of 20% to 100%, or 20% to 80%, or 40% to 60%. In certain embodiments, the method includes either charging or discharging the battery to a state of charge (SOC) of 50%. A 50% SOC is where the positive and negative electrode materials are most stable. At too high SOC, oxidation of electrolyte at the positive electrode can occur. At too low SOC, reduction of components can occur.

The steam sterilizing step is typically carried out at a controlled temperature, which may vary with sterilizer (e.g., autoclave). The recommendation from the U.S. Center for Disease Control on steam sterilization includes minimum exposure periods (for sterilization of wrapped healthcare supplies) of 30 minutes at 121° C. (250° F.) in a gravity displacement sterilizer or 4 minutes at 132° C. (270° C.) in a prevacuum sterilizer (see, e.g., https://www.cdc.gov/hicpac/Disinfection_Sterilization/13_0Sterilization.html). The recommendation from the French Ministry of Health is more extreme—steam autoclave cycle of 134° C. for 18 minutes (see, for example, French Ministry of Health: DGS/5 C/DHOS/E 2 no 2001-138 (14 Mar. 2001) at http://social-sante.gouv.fr/fichiers/bo/2001/01-1/a0110756.htm.

In certain embodiments, a battery of the present disclosure can survive (e.g., as in steam sterilization) a temperature of at least 100° C., or at least 121° C., or at least 132° C., or at least 135° C., or at least 140° C. In certain embodiments, a battery of the present disclosure can withstand such high temperatures (e.g., as in steam sterilization) for at least 4 minutes, or at least 12 minutes, or at least 18 minutes, or at least 90 minutes, or at least 120 minutes, or at least 180 minutes, or at least 360 minutes.

In certain embodiments, a battery of the present disclosure can survive a temperature of up to 300° C., or up to 250° C., for up to 168 hours. Typically, however, steam sterilizing a battery occurs at a temperature of no greater than 134° C. for a time of no greater than 18 minutes at the maximum temperature.

In certain embodiments, a battery of the present disclosure can survive (e.g., as in steam sterilization) a temperature of at least 100° C. for a time of at least 4 minutes, or at least 12 minutes, or at least 18 minutes, or at least 90 minutes, or at least 120 minutes, or at least 180 minutes, or at least 360 minutes.

In certain embodiments, a battery of the present disclosure can survive (e.g., as in steam sterilization) a temperature of at least 121° C. for a time of at least 4 minutes, or at least 12 minutes, or at least 18 minutes, or at least 90 minutes, or at least 120 minutes, or at least 180 minutes, or at least 360 minutes.

In certain embodiments, a battery of the present disclosure can survive (e.g., as in steam sterilization) a temperature of at least 132° C. for a time of at least 4 minutes, or at least 12 minutes, or at least 18 minutes, or at least 90 minutes, or at least 120 minutes, or at least 180 minutes, or at least 360 minutes.

In certain embodiments, a battery of the present disclosure can survive (e.g., as in steam sterilization) a temperature of at least 135° C. for a time of at least 4 minutes, or at least 12 minutes, or at least 18 minutes, or at least 90 minutes, or at least 120 minutes, or at least 180 minutes, or at least 360 minutes.

In certain embodiments, a battery of the present disclosure can survive (e.g., as in steam sterilization) a temperature of at least 140° C. for a time of at least 4 minutes, or at least 12 minutes, or at least 18 minutes, or at least 90 minutes, or at least 120 minutes, or at least 180 minutes, or at least 360 minutes.

In certain embodiments, after using the various conditions (e.g., sterilization conditions) described, the battery retains a capacity of at least 80% of the capacity at application temperature of a battery having the same construction that has not been sterilized. In certain embodiments, the method further includes charging the sterilized lithium ion battery to 100% while maintaining sterilization.

In certain embodiments, the method includes the steps of either charging or discharging the battery and steam sterilizing at least 2 times, or at least 10 times. In certain embodiments, the method includes the steps of either charging or discharging the battery and steam sterilizing up to 500 times.

Exemplary Embodiments of the Disclosure

Embodiment 1 is a lithium ion battery comprising:
a positive electrode comprising:
  a positive current collector comprising aluminum;
  positive electrode material comprising a lithium-containing metal oxide or a lithium-containing metal phosphate;
  a binder; and
  conductive carbon:
a negative electrode comprising:
  a negative current collector comprising copper, aluminum, titanium, or carbon;
  negative electrode material comprising a lithium titanium oxide, a carbon-containing material capable of intercalating lithium, a metal-alloy containing material capable of intercalating lithium, or a combination thereof;
a binder; and
conductive carbon:
a separator comprising a material having a melt temperature of greater than 150° C.; and
an electrolyte comprising an organic solvent and a lithium salt;
wherein the organic solvent comprises a solvent having a boiling point below 140° C. (e.g., a linear carbonate):
wherein the lithium salt comprises lithium bis(trifluoromethanesulfonimide) (LiTFSI); and
wherein, after exposure to conditions comprising a temperature of at least 100° C. for a time of at least 4 minutes, the battery retains a capacity of at least 80% of the capacity at application temperature of a battery having the same construction that has not been subjected to such conditions.

Embodiment 2 is the battery of embodiment 1 wherein the positive current collector comprises surface-treated aluminum.

Embodiment 3 is the battery of embodiment 2 wherein the surface-treated aluminum comprises carbon-coated aluminum.

Embodiment 4 is the battery of any one of embodiments 1 through 3 wherein the positive electrode material comprises a lithium-containing metal oxide, which is optionally surface treated.

Embodiment 5 is the battery of embodiment 4 wherein the surface-treated positive electrode material comprises a surface treatment selected from a metal oxide ($Al_2O_3$, etc.), a metal phosphate ($LaPO_4$, etc.), a metal halide, carbon, or a mixture thereof.

Embodiment 6 is the battery of embodiment 5 wherein the lithium-containing metal oxide comprises $LiCoO_2$ or $LiNiCoMn/AlO_2$.

Embodiment 7 is the battery of any one of embodiments 1 through 6 wherein the positive electrode material comprises a lithium-containing metal phosphate.

Embodiment 8 is the battery of embodiment 7 wherein the lithium-containing metal phosphate comprises $LiFePO_4$.

Embodiment 9 is the battery of any one of embodiments 1 through 8 wherein the positive electrode binder comprises carboxy methyl cellulose (CMC), styrene-butadiene rubber (SBR), polyvinylidene fluoride (PVDF), polytetrafluoroethylene (PTFE), or a mixture of two or more thereof.

Embodiment 10 is the battery of embodiment 9 wherein the positive electrode binder comprises PVDF.

Embodiment 11 is the battery of embodiment 9 or 10 wherein the positive electrode comprises a binder in an amount of at least 0.1 wt-%, based on the total weight of the dry cathode mix (without solvent).

Embodiment 12 is the battery of any one of embodiments 9 through 11 wherein the positive electrode comprises a binder in an amount of up to 10 wt-%, based on the total weight of the dry cathode mix (without solvent).

Embodiment 13 is the battery of any one of embodiments 1 through 12 wherein the negative current collector is surface treated.

Embodiment 14 is the battery of embodiment 13 wherein the surface-treated negative current collector comprises a surface treatment selected from a carbon coating, a nitrogen coating, or an oxide coating on copper, aluminum, titanium, or carbon.

Embodiment 15 is the battery of any one of embodiments 1 through 14 wherein the negative current collector comprises copper (particularly when the negative electrode material comprises graphite).

Embodiment 16 is the battery of any one of embodiments 1 through 14 wherein the negative current collector comprises aluminum (particularly when the negative electrode material comprises a lithium titanium oxide).

Embodiment 17 is the battery of any one of embodiments 1 through 16 wherein the negative electrode material comprises a lithium titanium oxide.

Embodiment 18 is the battery of embodiment 17 wherein the lithium titanium oxide is a lithium titanate spinel selected from the group of: $Li_4M_xTi_{15-x}O_{12}$ (wherein M is metal selected from aluminum, magnesium, nickel, cobalt, iron, manganese, vanadium, copper, chromium, molybdenum, niobium, or combinations thereof and x=0-1); $Li_xTi_yO_4$ (wherein x=0-4, and y=0-2); $Li_2TiO_3$; $Li_4Ti_5O_{12}$; $Li_4Ti_{4.75}V_{0.25}O_{12}$; $Li_4Ti_{4.75}Fe_{0.25}O_{11.88}$; $Li_4Ti_{4.5}Mn_{0.5}O_{12}$; and $LiM'M''XO_4$ (wherein: M' is a metal selected from nickel, cobalt, iron, manganese, vanadium, copper, chromium, molybdenum, niobium, or combinations thereof; M'' is a three valent non-transition metal, and X is zirconium, titanium, or a combination of these two).

Embodiment 19 is the battery of embodiment 18 wherein the lithium titanium oxide is of the formula $Li_4Ti_5O_{12}$ (sometimes referred to as $Li_{1+x}[Li_{1/3}Ti_{5/3}]O_4$, with $0 \leq x < 1$).

Embodiment 20 is the battery of any one of embodiments 1 through 16 wherein the negative electrode material comprises a carbon-containing material capable of intercalating lithium.

Embodiment 21 is the battery of embodiment 20 wherein the negative electrode material comprises graphite.

Embodiment 22 is the battery of embodiment 21 wherein the graphite comprises artificial graphite (e.g., MCMB).

Embodiment 23 is the battery of any one of embodiments 1 through 22 wherein the negative electrode binder comprises carboxy methyl cellulose (CMC), styrene-butadiene rubber (SBR), polyvinylidene fluoride (PVDF), polytetrafluoroethylene (PTFE), or a mixture of two or more thereof.

Embodiment 24 is the battery of embodiment 23 wherein the negative electrode binder comprises PVDF.

Embodiment 25 is the battery of any one of embodiments 1 through 24 wherein the negative electrode comprises a binder in an amount of at least 1 wt-%, based on the total weight of the dry anode mix (without solvent).

Embodiment 26 is the battery of any one of embodiments 1 through 25 wherein the negative electrode comprises a binder in an amount of up to 10 wt-%, based on the total weight of the dry anode mix (without solvent).

Embodiment 27 is the battery of any one of embodiments 1 through 26 wherein the separator comprises one or more layers of material having a melt temperature of greater than 150° C. In certain embodiments, the separator includes multiple separator layers with different melting points, which may be laminated together to form a single multilayer composite separator.

Embodiment 28 is the battery of any one of embodiments 1 through 27 wherein separator comprises a polyimide, polyolefin (such as polypropylene), polyethylene terephthalate, ceramic-coated polyolefin, cellulose, or a mixture of two or more thereof.

Embodiment 29 is the battery of embodiment 27 or 28 wherein the separator comprises a combination of microfibers and nanofibers.

Embodiment 30 is the battery of embodiment 29 wherein the separator comprises polyethylene terephthalate microfibers and cellulose nanofibers.

Embodiment 31 is the battery of any one of embodiments 1 through 30 wherein the separator is no more than 250 microns thick.

Embodiment 32 is the battery of any one of embodiments 1 through 31 wherein the electrolyte comprises LiTFSI in an amount of at least 50 mol-% of the total moles of electrolyte salt (or at a concentration of at least 0.5M).

Embodiment 33 is the battery of any one of embodiments 1 through 32 wherein the electrolyte comprises LiTFSI in an amount of up to 100 mol-% of the total moles of electrolyte salt (or at a concentration of up to 5.5M).

Embodiment 34 is the battery of any one of embodiments 1 through 33 wherein the electrolyte comprises a combination of lithium salts.

Embodiment 35 is the battery of any one of embodiments 1 through 33 wherein the electrolyte salt consists of one or more lithium salts.

Embodiment 36 is the battery of any one of embodiments 1 through 35 wherein the electrolyte salt further comprises a lithium salt selected from lithium bis(oxalato)borate (LiBOB), lithium bis(pentafluoroethylsulfonyl)imide (LiBETI), lithium bis(fluorosulfonyl)imide (LiFSI), lithium difluoro(oxalato)borate (LiDFOB), lithium tetrafluoroborate (LiBF$_4$), lithium trifluoromethanesulfonate (LiTriflate), lithium hexafluoroarsenate (LiAsF$_6$), lithium hexafluorophosphate (LiPF$_6$), or a mixture of two or more thereof.

Embodiment 37 is the battery of embodiment 36 wherein the electrolyte salt comprises LiTFSI and LiBOB.

Embodiment 38 is the battery of embodiment 36 or 37 wherein the electrolyte salt comprises LiTFSI, LiPF$_6$, and LiBOB.

Embodiment 39 is the battery of embodiment 38 wherein LiPF$_6$ is present in an amount of no greater than 25 mol-% of the total moles of electrolyte salt (or at a concentration of up to 0.3M).

Embodiment 40 is the battery of embodiment 38 or 39 wherein the electrolyte comprises LiPF$_6$ in an amount of at least 1 mol-% of the total moles of electrolyte salt (or at a concentration of at least 0.01M).

Embodiment 41 is the battery of any one of embodiments 37 through 40 wherein the electrolyte comprises LiBOB in an amount of at least 2 mol-% of the total moles of electrolyte salt (or at a concentration of at least 0.01M).

Embodiment 42 is the battery of any one of embodiments 37 through 41 wherein the electrolyte comprises LiBOB at a concentration up to the solubility limit of LiBOB.

Embodiment 43 is the battery embodiment 37 wherein the electrolyte comprises 81.8 mol-% LiTFSI and 18.2 mol-% LiBOB of the total moles of electrolyte salt (or 0.9M LiTFSI and 0.2M LiBOB).

Embodiment 44 is the battery of embodiment 38 wherein the electrolyte comprises 81.8 mol-% LiTFSI, 13.6 mol-% LiBOB, and 4.5 mol-% LiPF$_6$ of the total moles of electrolyte salt (or 0.9M LiTFSI, 0.15M LiBOB, and 0.05M LiPF$_6$).

Embodiment 45 is the battery of any one of embodiments 1 through 44 wherein the negative electrode material comprises a metal-alloy containing material capable of intercalating lithium.

Embodiment 46 is the battery of embodiment 45 wherein metal-alloy containing material comprises silicon-containing material or tin-containing material that is capable of intercalating lithium.

Embodiment 47 is the battery of any one of embodiments 1 through 46 wherein the organic solvent comprises a linear carbonate selected from ethylmethyl carbonate (EMC), dimethyl carbonate (DMC), diethyl carbonate (DEC), and a mixture of two or more thereof.

Embodiment 48 is the battery of embodiment 47 wherein the organic solvent comprises a mixture of ethylene carbonate (EC) and ethylmethyl carbonate (EMC).

Embodiment 49 is the battery of embodiment 48 wherein the organic solvent comprises a mixture of ethylene carbonate (EC) and ethylmethyl carbonate (EMC) in a range of 10:90 to 50:50.

Embodiment 50 is the battery of embodiment 49 wherein the organic solvent comprises a mixture of ethylene carbonate (EC) and ethylmethyl carbonate (EMC) in a ratio of 30:70.

Embodiment 51 wherein the battery of any one of embodiments 1 through 50 wherein the organic solvent further comprises a cyclic carbonate, or a mixture of two or more thereof.

Embodiment 52 wherein the battery of embodiment 51 wherein the cyclic carbonate is selected from ethylene carbonate (EC), propylene carbonate (PC), butylene carbonate (BC), fluoroethylene carbonate (FEC), and a mixture of two or more thereof.

Embodiment 53 is the battery of any of embodiments 1 through 52 wherein the electrolyte comprises a polymer, forming a gel electrolyte.

Embodiment 54 is the battery of embodiment 53 wherein the polymer is selected from PEO (poly(ethylene oxide)), PEGDA (poly(ethylene glycol) diacrylate)), PVDF (poly(vinylidene fluoride)), PVDF-HFP (poly(vinylidene floride-co-hexafluorophosphate)), PMMA (poly(methyl methacrylate)), methyl cellulose, hypromellose, poly(butyl acrylate) and similar acrylates.

Embodiment 55 is the battery of any one of embodiments 1 through 54 wherein the electrolyte comprising an electrolyte additive.

Embodiment 56 is the battery of embodiment 55 wherein the electrolyte additive is selected from an unsaturated compound (such as vinylene carbonate (VC) and vinyl ethylene carbonate (VEC)), a sulfur-containing compound (such as 1,3-propane sultone (PS), prop-1-ene 1,3-sultone (PES), 1,3,2-dioxathiolane-2,2-dioxide (DTD), trimethylene sulfate (TMS), and methylene methyl disulfonate (MMDS)), a boron-containing compound (such as trimethylboroxin and trimethoxyboroxine (TMOBX)), a phosphorus-containing compound (such as tris(1,1,1,3,3,3-hexafluoro-2-isopropyl) phosphate (HFiP), tris(trimethylsilyl) phosphate (TTSP), tris(trimethylsilyl) phosphite (TTSPi), and triallyl phosphate (TAP)), an aromatic compound (such as biphenyl (BP)), a heterocyclic compound (such as thiophene (TP)), a Lewis acid-base adduct (such as pyridine-boron trifluoride (PBF)), and a mixture of two or more thereof.

Embodiment 57 is the battery of embodiment 55 or 56 wherein the electrolyte additive is present in the electrolyte in an amount of 5 wt-% to 10 wt-%.

Embodiment 58 is the battery of any one of embodiments 1 through 57 further comprising an encasement.

Embodiment 59 is the battery of embodiment 58 wherein the encasement is made of a corrosion-resistant material.

Embodiment 60 is the battery of embodiment 59 wherein the corrosion-resistant material comprises aluminum, stainless steel, aluminum laminate, ceramic, or combinations thereof.

Embodiment 61 is the battery of any one of embodiments 58 through 60 wherein the encasement is hermetically sealed.

Embodiment 62 is the battery of embodiment 61 wherein the hermetically sealed encasement comprises glass or ceramic insulator around a feed through.

Embodiment 63 is a lithium ion battery comprising:
a positive electrode comprising:
a positive current collector comprising carbon-coated aluminum;
positive electrode material comprising $LiCoO_2$:
a binder; and
conductive carbon;
a negative electrode comprising:
a negative current collector comprising copper;
negative electrode material comprising artificial graphite;
a binder; and
conductive carbon;
a separator comprising a material having a melt temperature of greater than 150° C.:
an electrolyte comprising:
a lithium salt comprising a combination of LiTFSI. LiBOB, and $LiPF_6$; and
an organic solvent comprising a mixture of ethylene carbonate (EC) and ethylmethyl carbonate (EMC); and
a hermetically sealed encasement;
wherein, after exposure to conditions comprising a temperature of at least 100° C. for a time of at least 4 minutes, the battery retains a capacity of at least 80% of the capacity at application temperature of a battery having the same construction that has not been subjected to such conditions.

Embodiment 64 is the battery of embodiment 63 wherein the electrolyte comprises LiTFSI in an amount of 50 mol-% to 100 mol-% of the total moles of electrolyte salt (or at a concentration of 0.5M to 5.5M).

Embodiment 65 is the battery of embodiment 63 or 64 wherein the electrolyte comprises LiBOB in an amount of at least 2 mol-% of the total moles of electrolyte salt (or at a concentration of 0.01M), up to the solubility limit of LiBOB.

Embodiment 66 is the battery of any one of embodiments 63 through 65 wherein $LiPF_6$ is present in an amount of no greater than 25 mol-% of the total moles of electrolyte salt (or at a concentration of up to 0.3M).

Embodiment 67 is the battery of embodiment 66 wherein the electrolyte comprises $LiPF_6$ at a concentration of at least 0.01M (or in an amount of at least 1 mole-% of the total moles of electrolyte salt).

Embodiment 68 is the battery of any one of embodiments 63 through 67 wherein, after exposure to conditions comprising a temperature of at least 100° C. for a time of at least 4 minutes, or at least 12 minutes, or at least 18 minutes, or at least 90 minutes, or at least 120 minutes, or at least 180 minutes, or at least 360 minutes, the battery retains a capacity of at least 80% of the capacity at application temperature of a battery having the same construction that has not been subjected to such conditions.

Embodiment 69 is the battery of any one of the preceding embodiments wherein, after exposure to conditions comprising a temperature of at least 121° C. for a time of at least 4 minutes, or at least 12 minutes, or at least 18 minutes, or at least 90 minutes, or at least 120 minutes, or at least 180 minutes, or at least 360 minutes, the battery retains a capacity of at least 80% of the capacity at application temperature of a battery having the same construction that has not been subjected to such conditions.

Embodiment 70 is the battery of any one of the preceding embodiments wherein, after exposure to conditions comprising a temperature of at least 132° C. for a time of at least 4 minutes, or at least 12 minutes, or at least 18 minutes, or at least 90 minutes, or at least 120 minutes, or at least 180 minutes, or at least 360 minutes, the battery retains a capacity of at least 80% of the capacity at application temperature of a battery having the same construction that has not been subjected to such conditions.

Embodiment 71 is the battery of any one of the preceding embodiments wherein, after exposure to conditions comprising a temperature of at least 135° C. for a time of at least 4 minutes, or at least 12 minutes, or at least 18 minutes, or at least 90 minutes, or at least 120 minutes, or at least 180 minutes, or at least 360 minutes, the battery retains a capacity of at least 80% of the capacity at application temperature of a battery having the same construction that has not been subjected to such conditions.

Embodiment 72 is the battery of any one of the preceding embodiments wherein, after exposure to conditions comprising a temperature of at least 140° C. for a time of at least 4 minutes, or at least 12 minutes, or at least 18 minutes, or at least 90 minutes, or at least 120 minutes, or at least 180 minutes, or at least 360 minutes, the battery retains a capacity of at least 80% of the capacity at application temperature of a battery having the same construction that has not been subjected to such conditions.

Embodiment 73 is a method for sterilizing a lithium ion battery, the method comprising: providing a lithium ion battery; either charging or discharging the battery to a state of charge (SOC) of 20% to 100%; and steam sterilizing the battery to form a sterilized lithium ion battery.

Embodiment 74 is the method of embodiment 73 wherein providing a lithium ion battery comprises providing a lithium ion battery of any one of embodiments 1 through 72.

Embodiment 75 is the method of embodiment 73 or 74 comprising either charging or discharging the battery to a state of charge (SOC) of 20% to 80%.

Embodiment 76 is the method of embodiment 75 comprising either charging or discharging the battery to a state of charge (SOC) of 40% to 60%.

Embodiment 77 is the method of embodiment 76 comprising either charging or discharging the battery to a state of charge (SOC) of 50%.

Embodiment 78 is the method of any one of embodiments 73 through 77 wherein steam sterilizing the battery includes subjecting the battery to a temperature of at least 100° C., or at least 121° C., or at least 132° C., or at least 135° C., or at least 140° C.

Embodiment 79 is the method of any one of embodiments 73 through 78 wherein steam sterilizing the battery includes subjecting the battery to steam sterilization for at least 4 minutes, or at least 12 minutes, or at least 18 minutes, or at least 90 minutes, or at least 120 minutes, or at least 180 minutes, or at least 360 minutes.

Embodiment 80 is the method of any one of embodiments 73 through 79 wherein steam sterilizing the battery occurs at a temperature of at least 100° C. for a time of at least 4 minutes, or at least 12 minutes, or at least 18 minutes, or at least 90 minutes, or at least 120 minutes, or at least 180 minutes, or at least 360 minutes.

Embodiment 81 is the method of any one of embodiments 73 through 80 wherein steam sterilizing the battery occurs at a temperature of at least 121° C. for a time of at least 4 minutes, or at least 12 minutes, or at least 18 minutes, or at least 90 minutes, or at least 120 minutes, or at least 180 minutes, or at least 360 minutes.

Embodiment 82 is the method of any one of embodiments 73 through 81 wherein steam sterilizing the battery occurs at a temperature of at least 132° C. for a time of at least 4 minutes, or at least 12 minutes, or at least 18 minutes, or at least 90 minutes, or at least 120 minutes, or at least 180 minutes, or at least 360 minutes.

Embodiment 83 is the method of any one of embodiments 73 through 82 wherein steam sterilizing the battery occurs at a temperature of at least 135° C. for a time of at least 4 minutes, or at least 12 minutes, or at least 18 minutes, or at least 90 minutes, or at least 120 minutes, or at least 180 minutes, or at least 360 minutes.

Embodiment 84 is the method of any one of embodiments 73 through 83 wherein steam sterilizing the battery occurs at a temperature of at least 140° C. for a time of at least 4 minutes, or at least 12 minutes, or at least 18 minutes, or at least 90 minutes, or at least 120 minutes, or at least 180 minutes, or at least 360 minutes.

Embodiment 85 is the method of any of embodiments 73 through 84 wherein the battery retains a capacity of at least 80% of the capacity at application temperature of a battery having the same construction that has not been sterilized.

Embodiment 86 is the method of any one of embodiments 73 through 85 further comprising charging the sterilized lithium ion battery to 100% while maintaining sterilization.

Embodiment 87 is the method of any one of embodiments 73 through 86 comprising either charging or discharging the battery and steam sterilizing at least 2 times.

Embodiment 88 is the method of embodiment 87 comprising either charging or discharging the battery and steam sterilizing at least 10 times.

Embodiment 89 is the method of embodiment 87 or 88 comprising either charging or discharging the battery and steam sterilizing up to 500 times.

EXAMPLES

Objects and advantages of this disclosure are further illustrated by the following examples, but the particular materials and amounts thereof recited in these examples, as well as other conditions and details, should not be construed to unduly limit this disclosure.

Cell Construction

Lithium ion cells of 100 mAh nominal capacity were constructed as spirally wound prismatic cells in a stainless-steel enclosure that was hermetically sealed and used a glass feedthrough. The positive electrodes were comprised of $LiCoO_2$ positive active material coated onto a carbon-coated aluminum current collector. The negative electrodes were comprised of artificial graphite negative active material coated onto a copper current collector. The positive and negative electrodes were prepared using a slurry coating and calendering process. Both electrodes included their respective active materials described above, a conductive carbon diluent, and a polymeric PVDF binder. The cells were filled with 1.5±0.1 g of electrolyte, the composition of which is described in Table 1. For Examples 1, 2, 3, and 5 the separator was a 25 μm nanofiber membrane with a melt integrity of 300° C., sold under the tradename of SILVER from Dreamweaver International (Greer, S.C.); while for Example 4 the separator was a 25 μm TWARON aramid nanofiber membrane with a melt integrity of 300° C. (available from Teijin Aramid), sold under the tradename of GOLD from Dreamweaver International (Greer, S.C.). Examples 2A and 2B had the same electrolyte composition, but varied in the separator material; for Example 2A the separator was Dreamweaver GOLD and Example 2B the separator was a 20 μm polyimide membrane with a melt integrity of approximately 450° C.

TABLE 1

Summary of cell construction differences for 5 examples described.

| Example | Salt(s) | Solvent Mixture | Separator |
|---|---|---|---|
| 1 | 1.2M $LiPF_6$ | 3:7 w:w EC:EMC | DW SILVER |
| 2 | 0.9M LiTFSI + 0.2M LiBOB | 3:7 w:w EC:EMC | DW SILVER |
| 2A | 0.9M LiTFSI + 0.2M LiBOB | 3:7 w:w EC:EMC | DW GOLD |
| 2B | 0.9M LiTFSI + 0.2M LiBOB | 3:7 w:w EC:EMC | Polyimide |
| 3 | 1.05M LiTFSI + 0.05M $LiPF_6$ | 3:7 w:w EC:EMC | DW SILVER |
| 4 | 0.9M LiTFSI + 0.15M LiBOB + 0.05M $LiPF_6$ | 3:7 w:w EC:EMC | DW GOLD |
| 5 | 0.9M LiTFSI + 0.2M LiBOB | 1:1 w:w EC:PC | DW SILVER |

DW = Dreamweaver

Experimental Protocol

Within 24 hours of filling the cells with electrolyte and sealing the cells, the cells were put through a formation protocol, described by:

1. Constant current (CC) charge at a rate of 0.1 C (current of 10 mA) to an upper cutoff voltage of 4.1 V
2. Constant voltage (CV) hold at 4.1 V for 4 hours
3. Open circuit storage for 30 hours
4. CC discharge at a rate of 0.1 C (current of 10 mA) to a lower cutoff voltage of 3.575 V
5. Open circuit storage for 10 minutes
6. CC charge at a rate of 0.1 C (current of 10 mA) to an upper cutoff voltage of 4.1 V
7. CV hold at 4.1 V for 1 hour
8. Open circuit storage for a minimum of 1 hour Once the formation protocol was complete, all cells proceeded through an initial electrochemical performance test, described by:

1. 12 CC-CV charge—CC discharge cycles of 0.5 C (50 mA) CC charge to 4.1 V with a CV hold at 4.1 V until the current was less than or equal to 4.2 mA, and 0.5 C (50 mA) CC discharge to 3.575 V
2. 1 CC-CV charge—CC discharge cycle of 0.1 C (10 mA) CC charge to 4.1 V with a CV hold at 4.1 V until the current was less than or equal to 4.2 mA, and 0.1 C (10 mA) CC discharge to 3.575 V
3. CC-CV charge at a rate of 0.1 C (10 mA) to 3.8 V with a CV hold at 4.1 V until the current was less than or equal to 4.2 mA Following the initial electrochemical performance test described above, the 1 kHz AC impedance and center thickness were measured at 20° C. for all cells and then the cells were divided into two groups: one control group and one exposed group. The control group remained at room temperature while the exposed group cells were placed into a convection oven at a temperature of 135° C. for two hours. Following the 135° C. exposure, the cells were allowed to cool to room temperature, then both the control and exposed group cells proceeded through a final electrochemical performance test, described by:

1. 14 CC-CV charge—CC discharge cycles of 0.5 C (50 mA) CC charge to 4.1 V with a CV hold at 4.1 V until the current was less than or equal to 4.2 mA, and 0.5 C (50 mA) CC discharge to 3.575 V 2. 1 CC-CV charge—CC discharge cycle of 0.1 C (10 mA) CC charge to 4.1 V with a CV hold at 4.1 V until the current was less than or equal to 4.2 mA, and 0.1 C (10 mA) CC discharge to 3.575 V 3. CC-CV charge at a rate of 0.1 C (10 mA) to 3.8 V with a CV hold at 4.1 V until the current was less than or equal to 4.2 mA Following the final electrochemical performance test described above, the 1 kHz AC impedance and center thickness were measured at 20° C. for all cells.

Results

Figure 2:
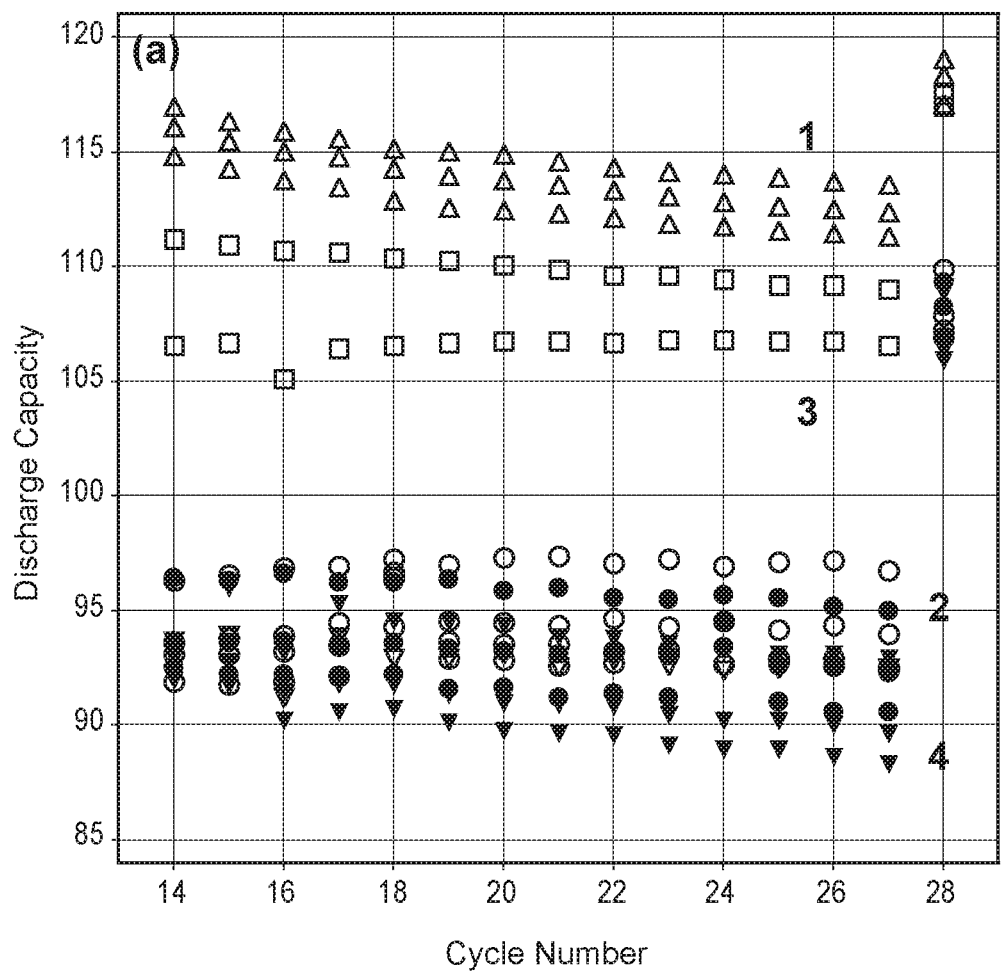
FIG. 2: Inset (a) of FIG. 1.
Figure 3:
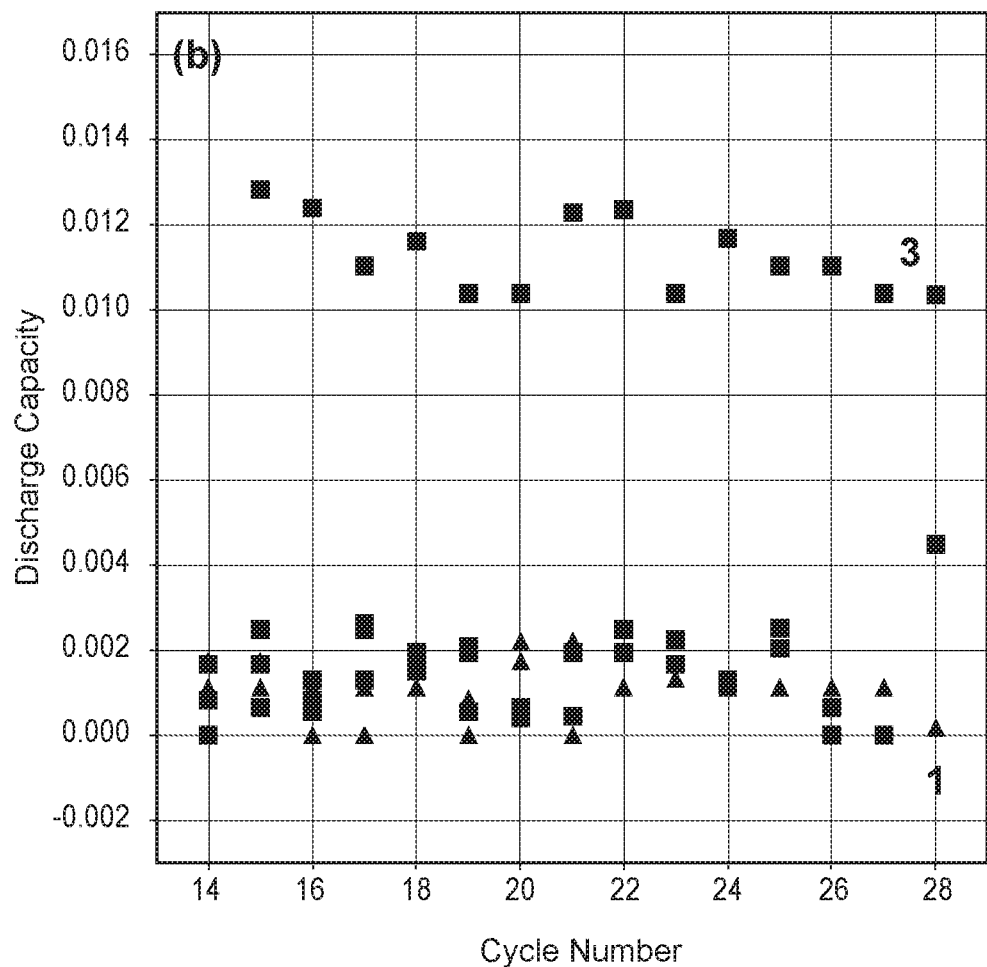
FIG. 3: Inset (b) of FIG. 1.

FIG. 1 shows the measured discharge capacity in mAh of the final electrochemical performance test for the control (open symbols) and exposed groups (closed symbols) for Examples 1 through 4 as defined in Table 1. As described above, cycles 14 through 27 were performed at a 0.5 C rate and cycle 28 was at a 0.1 C rate. For clarity, two regions in FIG. 1, marked (a) and (b) are expanded in FIG. 2 and FIG. 3, respectively.

Figure 4:
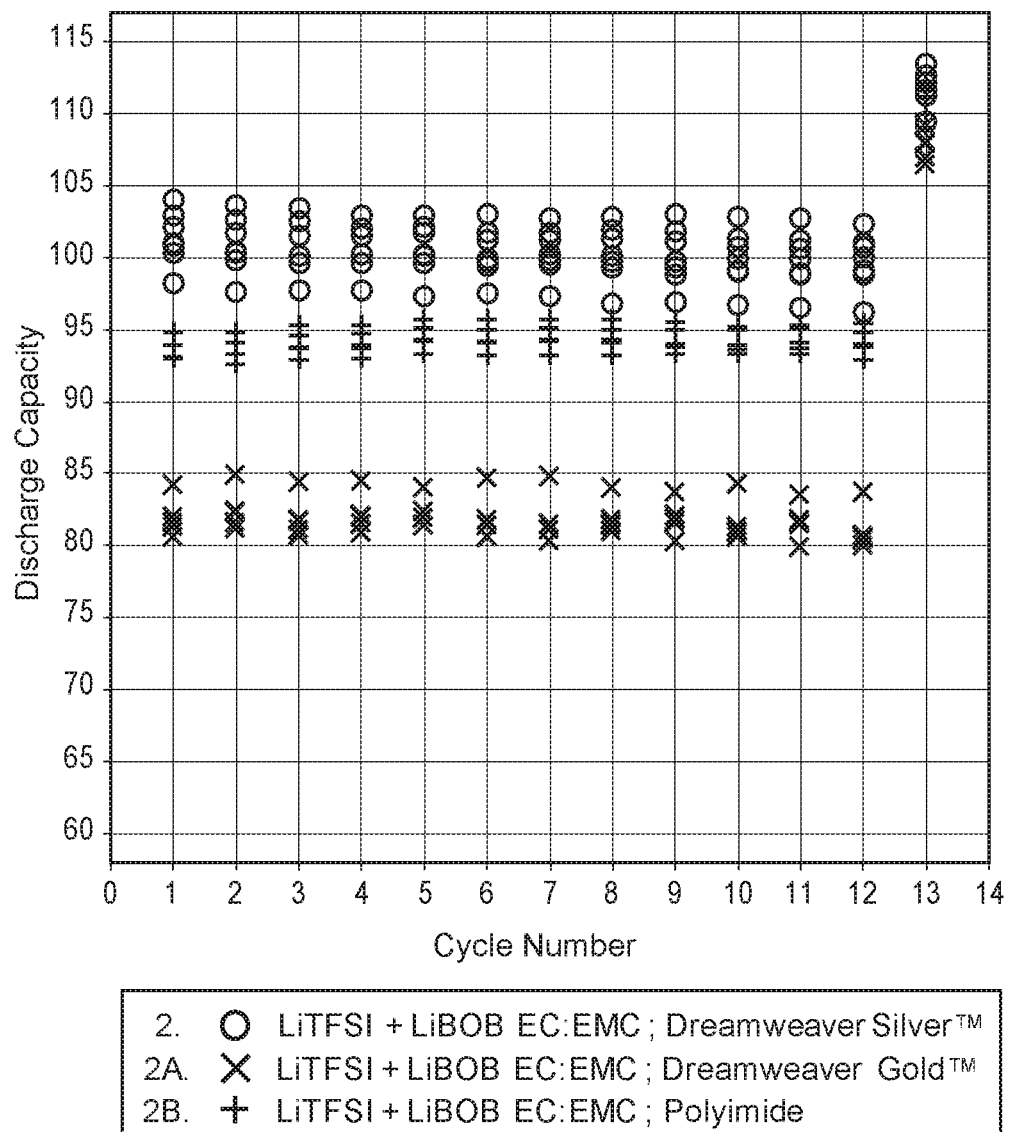
FIG. 4: Discharge capacity as a function of cycle number for the initial electrochemical performance test as a function of separator type for Examples 2, 2A, 2B.
Figure 5:
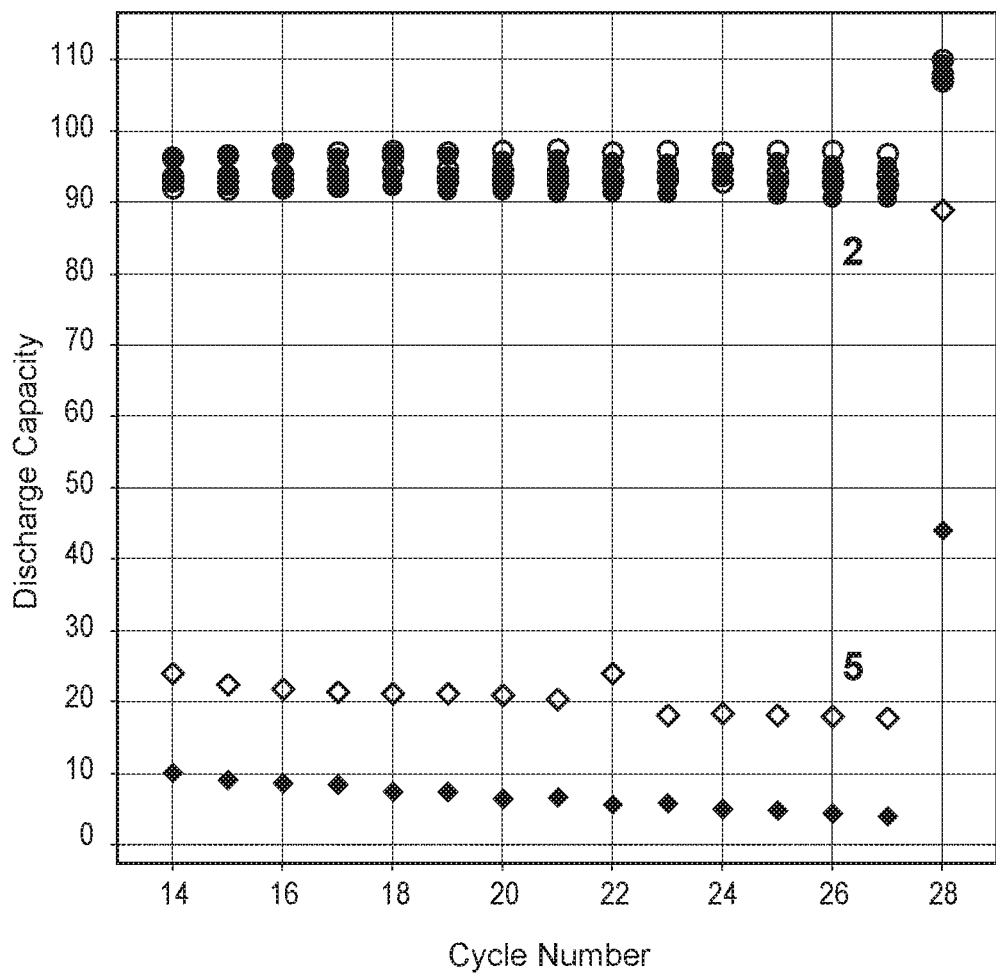
FIG. 5: Discharge capacity as a function of cycle number for the final electrochemical performance test for Examples 2 and 5.

FIG. 4 shows the impact of separator choice on the measured discharge capacity for the initial electrochemical performance test for Examples 2, 2A, and 2B. FIG. 5 shows the measured discharge capacity in mAh of the final electrochemical performance test for the control (open symbols) and exposed (closed symbols) groups for Examples 2 and 5. Examples 2 and 5 have the same electrolyte salt composition and vary only in the solvent composition.

Table 2 gives a summary of the average measured discharge capacities at both 0.5 C and 0.1 C rates for both control and exposed cells for all 5 examples described. The 0.5 C discharge capacities were tabulated for cycle 27 (the last of the final electrochemical performance test 0.5 C cycles). The ratio of the discharge capacity measured at 0.5 C to the that measured at 0.1 C is tabulated as a measure of the power capability of the cell; i.e., the ability to deliver a large fraction of its total available capacity at a high (e.g., 0.5 C) rate. The percentage of retained capacity as a result of exposure at both 0.5 C and 0.1 C is also tabulated, and is defined as the ratio of the measured capacities of the exposed cells to the measured capacities of the control cells at the given rate.

TABLE 2

Summary of average measured discharge capacities ($Q_d$) and comparison of capacity of exposed cells to control cells

| Example | Control 0.5 C $Q_d$ (mAh) | Control 0.1 C $Q_d$ (mAh) | Control (0.5 C $Q_d$/ 0.1 C $Q_d$) | Exposed 0.5 C $Q_d$ (mAh) | Exposed 0.1 C $Q_d$ (mAh) | %0.5 C $Q_d$ retained | %0.1 C $Q_d$ retained |
|---|---|---|---|---|---|---|---|
| 1 | 112.4 | 118.1 | 0.95 | 0.0 | 0.0 | 0.0 | 0.0 |
| 2 | 93.9 | 108.0 | 0.87 | 92.6 | 108.1 | 98.6 | 100.2 |
| 3 | 107.7 | 117.2 | 0.92 | 0.0 | 0.0 | 0.0 | 0.0 |
| 4 | 92.5 | 109.0 | 0.85 | 91.3 | 107.4 | 98.7 | 98.5 |
| 5 | 17.8 | 89.0 | 0.20 | 4.0 | 43.9 | 22.6 | 49.4 |

Table 3 gives a summary of the average percent increase of the 1 kHz AC impedance and the cell thickness as a result of the high temperature exposure. In both cases the increase is calculated as the difference between the measurements taken after the final and initial electrochemical performance tests divided by the measurements taken after the initial tests, and then converted to a percentage. Only results for the exposed cells are tabulated.

TABLE 3

Summary of percentage increase of 1 kHz AC impedance and cell thickness as a result of 135° C. exposure for 2 hours

| Example | Percent 1 kHz AC Impedance Increase | Percent Cell Thickness Increase |
|---|---|---|
| 1 | 3870.6 | 77.9 |
| 2 | 16.4 | 5.8 |
| 3 | 452.0 | 54.5 |
| 4 | 27.4 | 4.9 |
| 5 | 33.5 | 24.2 |

Cells containing only $LiPF_6$ as an electrolyte salt (Example 1, triangles) showed complete capacity loss after being exposed to 135° C. temperature. There was also a nearly 4000% increase in impedance and a 78% thickness increase as a result of exposure. The cell enclosure can only withstand approximately 80-85% thickness increase before the enclosure mechanically fails. This is in contrast to the results presented in U.S. Pat. Pub. No. US 2006/019164 (Bonhomme et al.) where 1M $LiPF_6$ was the preferred electrolyte salt enabling cell operation up to 150° C.

Cells containing a combination of 0.9M LiTFSI and 0.2M LiBOB as the electrolyte salt (Example 2, circles) showed excellent agreement in the measured capacity between the control and exposed cells at both 0.5 C and 0.1 C rates (99% and 100% capacity retention, respectively). This exemplary combination showed almost no change in the application temperature (37° C.) cell performance and little increase in impedance and thickness as a result of the 135° C. exposure for two hours, while maintaining high power capability at the application temperature.

Cells containing a combination of 0.9M LiTFSI and 0.2M LiBOB as the electrolyte salt with separator consisting of Dreamweaver SILVER (Example 2, circles), Dreamweaver GOLD (Example 2A, crosses), and polyimide (Example 2B, pluses) showed varying delivered discharge capacities for the initial electrochemical performance tests, predominately for the higher rate (0.5 C) cycles. Initial room temperature (20° C., as built, before formation) 1 kHz AC impedance for the Example 2, 2A, and 2B cells were measured to be 0.33Ω, 0.57Ω, and 0.31Ω, respectively. The Dreamweaver GOLD separator has an intrinsically higher impedance than both Dreamweaver SILVER and the polyimide material. This is in good agreement with the measured discharge capacities.

Cells containing a combination of 1.05M LiTFSI and 0.05M $LiPF_6$ as the electrolyte salt (Example 3, squares) also showed complete capacity loss after being exposed to 135° C. temperature. Even with only 0.05M $LiPF_6$, the cells also showed a 450% increase in impedance and 55% increase in thickness, which was very similar to the performance of the electrolyte containing solely $LiPF_6$. The results of Example 3 again contrasted the results of U.S. Pat. Pub.

No. US 2006/019164 (Bonhomme et al.) where 1M LiPF$_6$ was the preferred electrolyte salt enabling cell operation up to 150° C.

Cells containing a combination of 0.9M LiTFSI, 0.15M LiBOB, and 0.05M LiPF$_6$ as the electrolyte salt (Example 4, inverted triangles) showed excellent agreement in the measured capacity between the control and exposed cells at both 0.5 C and 0.1 C rates (99% and 99% capacity retention, respectively). Surprisingly, despite the addition of 0.05M LiPF$_6$ to the electrolyte which resulted in complete capacity loss in Example 3, Example 4 cells performed as well as the Example 2 cells. As described previously, the Example 4 cells were built with Dreamweaver GOLD separator while all Examples were built with Dreamweaver SILVER. The Dreamweaver GOLD has an intrinsically higher impedance due to the difference in fiber composition, as seen in comparison of the measured capacity for Example 2 (Dreamweaver SILVER) with Example 2A (Dreamweaver GOLD). Despite the higher impedance, and therefore lowered capacity, the Example 4 cells deliver nearly the same capacity as the Example 2 cells, and higher capacity than the Example 2A cells, indicating a higher electrolyte conductivity for the Example 4 salt combination.

Cells containing a combination of 0.9M LiTFSI and 0.2M LiBOB as the electrolyte salt with 1:1 by weight ratio of EC:PC as the electrolyte solvent system (Example 5, diamonds) show significantly lower capacities, for both control and exposed cells, compared to the same salt combination with 3:7 EC:EMC solvent (Example 2). The mixture of 1:1 EC:PC was the preferred solvent system used in U.S. Pat. Pub. No. US 2006/019164 (Bonhommet et al.) for high temperature operation. While this solvent system has demonstrated value when the operating temperature of the lithium ion cell is very high, the results shown here demonstrate the severe power limitations of this solvent system with all cyclic carbonates (high boiling points) at application temperature. The application temperature ratio of the discharge capacity delivered at 0.5 C to that at 0.1 C is 0.20, while this ratio is 0.87 for EC:EMC solvent, making the all-high boiling point solvent system impractical for cells designed to operate at application temperatures. Furthermore, with the EC:PC solvent blend, the retained capacity following 135° C. exposure was only 23% and 49% for 0.5 C and 0.1 C cycling, respectively.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

The invention claimed is:

1. A lithium ion battery comprising:
   a positive electrode comprising:
      a positive current collector comprising aluminum;
      positive electrode material comprising a lithium-containing metal oxide or a lithium-containing metal phosphate;
      a binder; and
      conductive carbon;
   a negative electrode comprising:
      a negative current collector comprising copper, aluminum, titanium, or carbon;
      negative electrode material comprising a lithium titanium oxide, a carbon-containing material capable of intercalating lithium, a metal-alloy containing material capable of intercalating lithium, or a combination thereof;
      a binder; and
      conductive carbon;
   a separator comprising a material having a melt temperature of greater than 150° C.; and
   an electrolyte comprising an organic solvent and lithium salt;
   wherein the organic solvent comprises a solvent having a boiling point below 140° C.; and
   wherein the lithium salt comprises lithium bis(trifluoromethanesulfonimide) (LiTFSI) in an amount of 50 mol-% or more of the total moles of electrolyte salt, lithium bis(oxalato)borate (LiBOB) in an amount of 2 mol-% or more of the total moles of electrolyte salt, and lithium hexafluorophosphate (LiPF$_6$) in an amount of 1 mol-% to 25 mol-% of the total moles of electrolyte salt.

2. The battery of claim 1 wherein the organic solvent comprises a linear carbonate.

3. The battery of claim 2 wherein the linear carbonate is selected from ethylmethyl carbonate (EMC), dimethyl carbonate (DMC), diethyl carbonate (DEC)), and a mixture of two or more thereof.

4. The battery of claim 1 wherein the organic solvent further comprises a cyclic carbonate, or a mixture of two or more thereof.

5. The battery of claim 1 wherein the positive current collector comprises surface-treated aluminum.

6. The battery of claim 1 wherein the positive electrode material comprises a lithium-containing metal oxide, which is optionally surface treated.

7. The battery of claim 1 wherein the negative current collector is surface treated.

8. The battery of claim 1 wherein the negative electrode material comprises a lithium titanium oxide.

9. The battery of claim 1 wherein the negative electrode material comprises a carbon-containing material capable of intercalating lithium.

10. The battery of claim 9 wherein the negative electrode material comprises graphite.

11. The battery of claim 1 wherein the separator comprises one or more layers of material comprising a first layer having a melt temperature of greater than 150° C., and a second layer having a melt temperature lower than the melt temperature of the first layer.

12. The battery of claim 1 wherein the electrolyte salt further comprises a lithium salt selected from lithium bis(pentafluoroethylsulfonyl)imide (LiBETI), lithium bis(fluorosulfonyl)imide (LiFSI), lithium difluoro(oxalato)borate (LiDFOB), lithium tetrafluoroborate (LiBF$_4$), lithium trifluoromethanesulfonate (LiTriflate), lithium hexafluoroarsenate (LiAsF$_6$), or a mixture of two or more thereof.

13. The battery of claim 1 wherein the electrolyte salt consists essentially of LiTFSI, LiPF$_6$, and LiBOB.

14. The battery of claim 1, wherein LiTFSI is present in an amount of about 81.8 mol-%, LiBOB is present in an amount of about 13.6 mol-%, and LiPF$_6$ is present in an amount of about 4.5 mol-%, of the total moles of electrolyte salt.

15. The battery of claim 1 wherein the electrolyte comprises an electrolyte additive.

16. A lithium ion battery comprising:
a positive electrode comprising:
   a positive current collector comprising carbon-coated aluminum;
   positive electrode material comprising $LiCoO_2$;
   a binder; and
   conductive carbon;
a negative electrode comprising:
   a negative current collector comprising copper;
   negative electrode material comprising artificial graphite;
   a binder; and
   conductive carbon;
a separator comprising a material having a melt temperature of greater than 150° C.;
an electrolyte comprising:
   a lithium salt comprising a combination of LiTFSI, LiBOB, and $LiPF_6$, wherein the LiTFSI is present in an amount of 50 mol-% or more of the total moles of electrolyte salt, LiBOB is present in an amount of 2 mol-% or more of the total moles of electrolyte salt, and the $LiPF_6$ is present in an amount of no greater than 25 mol-% of the total moles of electrolyte salt or at a concentration of up to 0.3M; and
   an organic solvent comprising a mixture of ethylene carbonate (EC) and ethylmethyl carbonate (EMC); and
a hermetically sealed encasement.

17. The battery of claim 1, wherein LiTFSI is present in an amount of about 0.9 M, LiBOB is present in an amount of about 0.15 M, and $LiPF_6$ is present in an amount of about 0.05 M.

* * * * *